United States Patent [19]
Hsu et al.

[11] Patent Number: 5,392,367
[45] Date of Patent: Feb. 21, 1995

[54] AUTOMATIC PLANAR POINT PATTERN MATCHING DEVICE AND THE MATCHING METHOD THEREOF

[76] Inventors: Wen H. Hsu, 3F No. 66 W. Yuan, Tsing Hua University, Hsinchu; Chen-Chieh Chien, No. 11 La. 73 Chung Shan 1st Rd., Keelung, both of

[21] Appl. No.: 88,579

[22] Filed: Jul. 9, 1993

Related U.S. Application Data

[63] Continuation of Ser. No. 676,796, Mar. 28, 1991, abandoned.

[51] Int. Cl.⁶ .......................... G06K 9/68; G06K 9/62
[52] U.S. Cl. ........................................ 382/39; 382/34
[58] Field of Search .................. 382/30, 34, 38, 39, 382/14, 15, 44–47

[56] References Cited

U.S. PATENT DOCUMENTS

| | | | |
|---|---|---|---|
| 3,588,823 | 6/1971 | Chow | 382/37 |
| 3,643,215 | 2/1972 | Ingham et al. | 382/39 |
| 4,030,068 | 6/1977 | Banz | 382/38 |
| 4,155,072 | 5/1979 | Kawa | 382/47 |
| 4,468,688 | 8/1984 | Gabriel et al. | 382/46 |
| 5,075,896 | 12/1991 | Wilcox et al. | 382/39 |

*Primary Examiner*—Michael T. Razavi
*Assistant Examiner*—David Fox
*Attorney, Agent, or Firm*—Bacon & Thomas

[57] ABSTRACT

Matching probability among planar point patterns is calculated by a mating probability calculating device to decide the corresponding relationship therebetween and the best point matching is then selected by a mating point selecting device. The similarity therebetween is computed by a similarity calculating device to decide correct the results of pattern matching. An algorithm associated with the devices is also provided.

10 Claims, 6 Drawing Sheets

| P\Q | q1 | q2 | q3 | q4 | q5 | q6 | q7 | q8 |
|---|---|---|---|---|---|---|---|---|
| p1 | 1 | 0 | 0 | 0 | 0 | 0 | 0 | 0 |
| p2 | 0 | 1 | 1 | 0 | 0 | 0 | 0 | 0 |
| p3 | 0 | 0 | 1 | 1 | 0 | 0 | 0 | 0 |
| p4 | 0 | 0 | 0 | 1 | 0 | 0 | 0 | 0 |
| p5 | 0 | 0 | 0 | 0 | 1 | 0 | 0 | 0 |
| p6 | 0 | 0 | 0 | 0 | 0 | 1 | 1 | 0 |
| p7 | 0 | 0 | 0 | 0 | 0 | 0 | 1 | 1 |
| p8 | 0 | 0 | 0 | 0 | 0 | 0 | 0 | 1 |

FIG. 5.

| P\Q | q1 | q2 | q3 | q4 | q5 | q6 | q7 | q8 |
|---|---|---|---|---|---|---|---|---|
| p1 | 0.8215 | 0 | 0 | 0 | 0 | 0 | 0 | 0 |
| p2 | 0 | 0.8691 | 0.7204 | 0 | 0 | 0 | 0 | 0 |
| p3 | 0 | 0 | 0.8858 | 0.6737 | 0 | 0 | 0 | 0 |
| p4 | 0 | 0 | 0 | 0.8852 | 0 | 0 | 0 | 0 |
| p5 | 0 | 0 | 0 | 0 | 0.8260 | 0 | 0 | 0 |
| p6 | 0 | 0 | 0 | 0 | 0 | 0.8559 | 0.7157 | 0 |
| p7 | 0 | 0 | 0 | 0 | 0 | 0 | 0.7947 | 0.6918 |
| p8 | 0 | 0 | 0 | 0 | 0 | 0 | 0 | 0.8640 |

FIG. 6.

| P\Q | q1 | q2 | q3 | q4 | q5 | q6 | q7 | q8 |
|---|---|---|---|---|---|---|---|---|
| p1 | 1 | 0 | 0 | 0 | 0 | 0 | 0 | 0 |
| p2 | 0 | 1 | 0 | 0 | 0 | 0 | 0 | 0 |
| p3 | 0 | 0 | 1 | 0 | 0 | 0 | 0 | 0 |
| p4 | 0 | 0 | 0 | 1 | 0 | 0 | 0 | 0 |
| p5 | 0 | 0 | 0 | 0 | 1 | 0 | 0 | 0 |
| p6 | 0 | 0 | 0 | 0 | 0 | 1 | 0 | 0 |
| p7 | 0 | 0 | 0 | 0 | 0 | 0 | 1 | 0 |
| p8 | 0 | 0 | 0 | 0 | 0 | 0 | 0 | 1 |

FIG. 7.

| P\Q | q1 | q2 | q3 | q4 | q5 | q6 | q7 | q8 |
|---|---|---|---|---|---|---|---|---|
| p1 | 0 | 0 | 0 | 0 | 0 | 0 | 0 | 0 |
| p2 | 0 | 0 | 0 | 0 | 0 | 0 | 0 | 0 |
| p3 | 1 | 1 | 0 | 0 | 0 | 0 | 0 | 0 |
| p4 | 0 | 0 | 1 | 1 | 0 | 0 | 0 | 0 |
| p5 | 0 | 0 | 0 | 0 | 1 | 1 | 0 | 0 |
| p6 | 0 | 0 | 0 | 0 | 0 | 0 | 1 | 1 |
| p7 | 0 | 0 | 0 | 0 | 0 | 0 | 0 | 0 |
| p8 | 0 | 0 | 0 | 0 | 0 | 0 | 0 | 0 |

FIG. 8.

| P\Q | q1 | q2 | q3 | q4 | q5 | q6 | q7 | q8 |
|---|---|---|---|---|---|---|---|---|
| p1 | 0 | 0 | 0 | 0 | 0 | 0 | 0 | 0 |
| p2 | 0 | 0 | 0 | 0 | 0 | 0 | 0 | 0 |
| p3 | 0.8402 | 0.8402 | 0 | 0 | 0 | 0 | 0 | 0 |
| p4 | 0 | 0 | 0.8402 | 0.8402 | 0 | 0 | 0 | 0 |
| p5 | 0 | 0 | 0 | 0 | 0.8402 | 0.8402 | 0 | 0 |
| p6 | 0 | 0 | 0 | 0 | 0 | 0 | 0.8402 | 0.8402 |
| p7 | 0 | 0 | 0 | 0 | 0 | 0 | 0 | 0 |
| p8 | 0 | 0 | 0 | 0 | 0 | 0 | 0 | 0 |

FIG. 9.

| P\Q | q1 | q2 | q3 | q4 | q5 | q6 | q7 | q8 |
|---|---|---|---|---|---|---|---|---|
| p1 | 0 | 0 | 0 | 0 | 0 | 0 | 0 | 0 |
| p2 | 0 | 0 | 0 | 0 | 0 | 0 | 0 | 0 |
| p3 | 1 | 0 | 0 | 0 | 0 | 0 | 0 | 0 |
| p4 | 0 | 0 | 1 | 0 | 0 | 0 | 0 | 0 |
| p5 | 0 | 0 | 0 | 0 | 1 | 0 | 0 | 0 |
| p6 | 0 | 0 | 0 | 0 | 0 | 0 | 1 | 0 |
| p7 | 0 | 0 | 0 | 0 | 0 | 0 | 0 | 0 |
| p8 | 0 | 0 | 0 | 0 | 0 | 0 | 0 | 0 |

FIG. 10.

AUTOMATIC PLANAR POINT PATTERN MATCHING DEVICE AND THE MATCHING METHOD THEREOF

This application is a continuation of application Ser. No. 07/676,796, filed Mar. 28, 1991, abandoned.

FIELD OF THE INVENTION

The invention relates generally to a device that matches planar point patterns and the method thereof, and particularly to matching digitalized computer images, such as finger prints, language characters, and planar figures.

BACKGROUND OF THE INVENTION

In the development of fifth generation computers, computer vision is one of the major topics. Computer vision consists of two parts, i.e. image processing and pattern recognition. Having been processed, a pattern shows its individual characteristic for recognizing. For example, feature points of a finger print are obtained with the processing operation and the feature points are used to check if the finger print is a particular one.

In computer reading or scanning of language characters, it is also possible to recognize the characters with the point pattern matching technique. FIG. 1-1 shows a hand-writing of a Chinese character. After being processed, the feature points obtained by a computer are shown in FIG. 1-2. FIG. 2-1 shows a different handwriting of the same Chinese character and the feature points obtained therefrom are shown in FIG. 2-2. The computer recognizes one of the characters, e.g. that of FIG. 1-1, by comparing the point pattern of FIG. 1-2 to that of FIG. 2-2 to decide if they are the feature point patterns obtained from the identical Chinese characters of FIG. 2-1.

Figure 11:
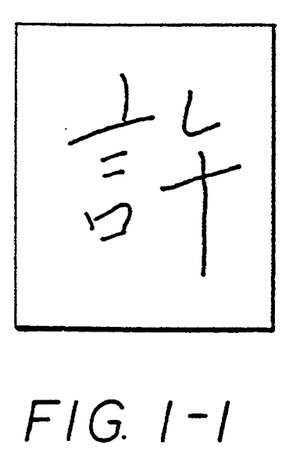
Figure 12:
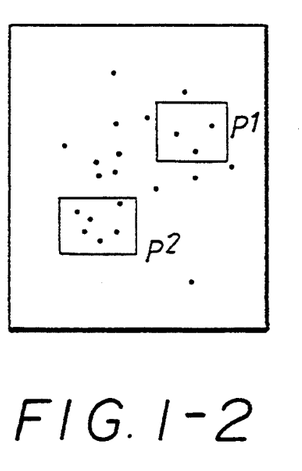
Figure 21:
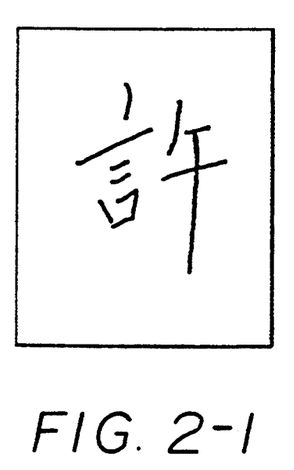

For those who understand Chinese, FIGS. 1-1 and 2-1 represent the same character. However, a computer can only decide this through a special procedure of comparison to be described.

Generally speaking, the comparison procedure comprises two kinds of operations matching and registration.

The matching procedure is finding a one-to-one correspondence between points of a first planar point pattern and those of a second planar point pattern. That is, a point of the first planar point pattern has one and only one point of the second planar point pattern is associated therewith.

The registration procedure is to translate, rotate and/or scale the first planar point pattern in a Euclidean plane so as to obtain an even similar pattern to the second planar point pattern (reference planar point pattern), and to more precisely determine the similarity therebetween.

Figure 22:
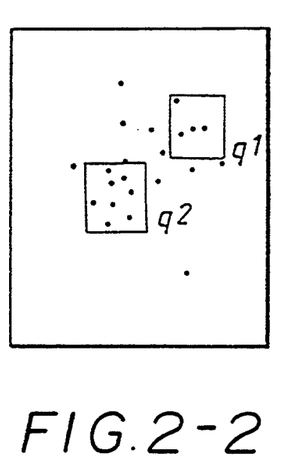

In image processing and pattern recognition for, such as, written characters and finger prints, there are two major difficulties, (1) the difference of the Number of feature points between two planar point patterns and (2) the unpredictable probability of a feature point appearing in both patterns, for example, the feature points of FIG. 2-2 should have a same number in theory but they do not. It is quite different between the zones marked $p_1$ and $q_1$ and those marked $p_2$ and $q_2$ in the figures. Not only are the point numbers different, but also the distributions thereof are different and difficult to predict.

Finger prints are another example. A finger print is a unique identification of a person that never changes for the whole life of a person. To recognize finger prints by use of the computer image processing technique in order to decide if two finger prints are a particular one is a goal that has been aimed at for a long time by the scientists. Since the tips of the fingers are soft and flexible, the finger prints thereof are usually distorted when the finger tips are pressed against a glass surface. Therefore, it is not possible for the feature points to completely show on the pattern to be processed. Statistically, the probability of the feature points of a finger print repeating in two patterns is only 60%.

Besides, the pressure exerted by distribution of the finger tip also affects the distribution of the feature points. The direction of the pressure usually rotates or translates the pattern. This increases the difficulty in comparing patterns finger prints.

SUMMARY OF THE PRESENT INVENTION

It is therefore the object of the present invention to provide an automatic planar point pattern matching device to more precisely match patterns that probably have different point numbers and/or unpredictable probability of the points repeating in both patterns.

It is another object of the present invention to provide an automatic planar point pattern matching device to more precisely match two patterns, even though the patterns have been rotated, translated and/or scaling.

It is a further object of the present invention to provide an speedy automatic planar point pattern matching device.

It is still a further object of the present invention to provide a method which provides the abovementioned functions of matching patterns.

To achieve the objects, there is provided an automatic planar point pattern matching device which makes use of a mating probability calculating device, a mating point selecting device and a similarity calculating device to match two best-mated patterns.

The mating probability calculating device of this invention uses the "fuzzy relaxation method" to calculate the probability of mating a point in the first pattern to all the points of the second pattern. The mating point selecting device uses "the sequential forward selection method" to select the best-mated point pair. The similarity calculating device utilizes the "mating probability", the "average mating probability", the "average distance between mated points" and the "scale factor" to decide if two patterns are originated from the identical source (for example, Chinese character of fingerprint).

Furthermore, to increase processing efficiency, some embodiments described hereinafter also provide a "sifting device" to exclude the relationship between impossibly-mated points, so as to shorten processing time. In one embodiment of this invention, the sifting device uses the "coarse matching method" to do sifting.

The present invention also provides a registration device which uses "least-mean-square-error" to rotate, translate and/or scale the planar point patterns to be matched so as to give a best situation for comparison.

BRIEF DESCRIPTION OF THE DRAWINGS

In the drawings:

FIG. 1-1 is a hand-writing of a Chinese character input from an image scanner;

FIG. 1-2 is the distribution of the characteristic points associated with the hand-writing shown in FIG. 1-1;

FIG. 2-1 is another hand-writing of a character shown in FIG. 1-1;

FIG. 2-2 is the distribution of the feature points associated with the hand-writing shown in FIG. 2-1;

DETAILED DESCRIPTION OF THE INVENTION

To start, the fuzzy relaxation method, the sequential forward selection method, and the similarity calculating method will be briefly described.

THE FUZZY RELAXATION METHOD

Consider two planar point patterns denoted as $$P = \{p_1, p_2, \ldots, p_m\}$$

$$Q = \{q_1, q_2, \ldots, q_n\}$$

An initial mating probability is assigned to each pair $(P_i, q_j)$ ($i=1, 2, \ldots, m$, $j=1, 2, \ldots, n$). It is obvious to give all pairs the same initial mating probability, for there is no difference for point $p_i$ of the set P to mate only point $q_j$ of the set Q, for $j=1, 2, \ldots, n$. The mating probability will then be repeatedly revised in accordance with the probability of another point $p_h$ to correctly mate another point $q_k$ in Q, when, $(p_i, q_j)$ is a correctly-mated pair. If $S^{(o)}(p_i, q_j)$ denotes the initial mating probability of the pair $(p_i, q_j)$ and $S^{(r)}(p_i, q_j)$ denotes the mating probability of the pair at the rth revision, then $$S^{(r)}(p_i, q_j) = \frac{\sum_{h \neq i, k \neq j} \{\max[S^{(r-1)}(p_i, q_j) \times C_{ij}(h, k)]\}}{m-1} \quad (1)$$

The reason to take the "max" operation is that $p_i$ and $q_j$ are assumed to be a one-to-one correspondence. The symbol $C_{ij}(h, k)$ represents the compatibility measure of another pair $(p_h, q_k)$, when $(p_i, q_j)$ is a correctly mated pair, and $C_{ij}(h, k)$ is defined as $$C_{ij}(h, k) = \frac{1}{1 + \Delta} \quad (2)$$

$$\Delta = \frac{|l_{ih} - l_{jk}|}{|l_{ih} + l_{jk}|} \quad (3)$$

where 1 is a symbol denoting the distance between points that are shown as subscripts.

Since $0 \leq \Delta \leq 1$, $0.5 \leq C_{ij}(h, k) \leq 1$. The compatibility measure therefore, will monotonously decrease from unity. Repeatedly revising the mating probability makes that of a correctly-mated pair remain of a greater value, while it approaches zero for a wrongly-mated pair.

The result of the above operation gives the possibility of a point belonging to the first pattern to be correctly mated to a point belonging to the second pattern.

COARSE MATCHING METHOD

In a coordinate system, if two points (which belong to different patterns) to be mated are remote from each other, then, obviously, they do not have a good chance to be a correctly-mated pair and the mating probability thereof approaches zero after being manipulated by the fuzzy relaxation method. Therefore, if the mating probability of an obvious wrongly-mated pair is assigned zero at the very beginning and the fuzzy relaxation method operates on the non-zero probabilities only, then the number of mathematic operations can be greatly reduced. This increases the overall efficiency of the method.

The present invention provides a coarse matching method to exclude the obvious wrongly-mated pairs. In principle, the coarse matching method sets the mating probabilities of those pairs having points remote from each other to zero. The criterion to decide if a point is far from its mating point is:

(a) $|X_{pi} - X_{qj}| > n$ or (b) $|Y_{pi} - Y_{qj}| > n$ where X and Y represent x- and y- coordinates respectively. The value n varies according to the origin of the patterns associated therewith. For example, a finger print and a character have different values for n.

SEQUENTIAL FORWARD SELECTION METHOD

The best-mated pair between two point sets P and Q can be obtained with the fuzzy relaxation method, repeatedly revising the mating probability several times, as described above. The way to pick out the best-mated pair from the matrix constituted by the probabilities of all pairs, each of which comprises a point of the first pattern and a point of the second pattern, is not unique. The conventional methods, such as linear programming, primalanul algorithm, out-of-kilter algorithm, however, are not useful in this case. This is because the sampling environments and the sampling process affect, more or less, the images taken thereby and thus the sampled point patterns P and Q differ to some extent, even though they represent the same configuration. The most significant differences are:

(a) The numbers of points of both sets P and Q which are different; and (b) The probability of the same point appearing in both sets cannot be told (some points may appear in P but not in Q, and vice versa).

To overcome the difficulties, a novel method, called "sequential forward selection method", is developed herein. To apply this method, a matrix $[S_{ij}]$ is formed first, wherein $i=1, 2, \ldots, m$ and $j=1, 2, \ldots, n$; m is the number of points in pattern P and n is that in pattern Q. The element $S_{ij}$ of the matrix is the mating probability of $p_i$ to $q_j$. Next, the largest K elements are selected from the matrix $[S_{ij}]$ and a set S is formed with these K elements, where $K=\min(m, n)$. The method can be carried on as follows.

(a) Locate the largest element $S_{max}$ of S in the Matrix $[S_{ij}]$ and the associated pair $(p_i, q_j)$ is assumed correctly mated.

(b) Remove the elements located in the same row or same column of $(p_i, q_j)$, i.e. $S_{ij}$ from the matrix $[S_{ij}]$.

(c) Remove $S_{max}$ from S.

(d) Repeat steps (a) to (c), until S becomes empty.

Although it may not be possible to pick out all the correctly-mated pairs with the above procedures, it is still good and perhaps the best method for handling those patterns of the same origin but having different numbers of points and an unpredictable probability for the same points to appear in both patterns.

SIMILARITY CALCULATING METHOD

For two patterns to match each other, their numbers of points which can be correctly mated, the mating probability of each pair and the coordinates of each point thereof are calculated with the abovedescribed methods. These parameters so obtained are then used to compute (1) the matching probability of the patterns $(X_1)$, (2) the average mating probability $(X_2)$, (3) the average distance between points of mated pairs $(X_3)$, and (4) the scaling factor $(X_4)$. Each of these four factors are defined in the following.

(a) Matching Probability $(X_1)$:

$$X_1 = \frac{(\text{number of correctly-mated pairs})^2}{(\text{number of points in } P) \times (\text{number of points in } Q)} \quad (4)$$

(b) Average Mating Probability $(X_2)$:

$$X_2 = \frac{\sum_{i=1}^{k} S^{(r)}(p_i, q_{mi})}{k} \quad (5)$$

(c) Average Distance Between Points of Mated Pairs $(X_3)$:

$$X_3 = \frac{\sum_{i=1}^{k} [(x_i - x'_{mi})^2 + (y_i - y'_{mi})^2]}{k} \quad (6)$$

(d) Scaling Factor $(X_4)$:

If it is given that $r_3$ and $r_4$ represent amounts of rotation from set P and to set Q and $r_3 = S.\cos\theta$ and $r_4 = S.\sin\theta$, then $S = \sqrt{r_3^2 + r_4^2}$ is the magnification scale where Q represents the angle of rotation and $X_4$ is defined as $$X_4 = 1 + |1 - S| \quad (7)$$

For two similar planar point patterns, $S \to 1$ and $X_4 \to 1$, otherwise $X_4 > 1$.

From the above definitions, we can conclude that if two sets P and Q are very similar, then $X_1 \to 1$, $X_2 \to 1$, $X_3 \to 0$ and $X_4 \to 1$, otherwise $X_1 \to 0$, $X_2 \to 0$, $X_3 > 0$ and $X_4 > 0$. And a score representing the similarity between P and Q can be obtained with $X_1$, $X_2$, $X_3$ and $X_4$; i.e.

$$\text{Score} = C \cdot \frac{X_1 \cdot X_2}{X_3 \cdot X_4}$$

where C is a constant.

Figure 3:
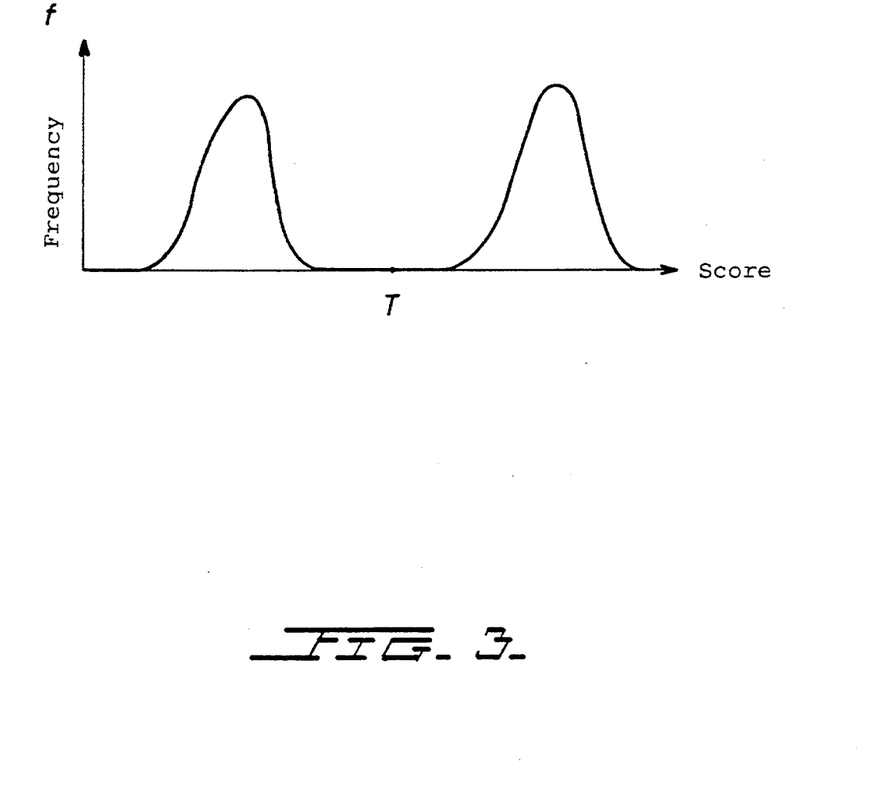
FIG. 3 is the distribution of similarity between patterns, after being processed by the similarity calculating device of the present invention.

By statistically analyzing a great number of cases, a curve of the score defined above can be obtained as shown in FIG. 3. Therefore, it can be seen that if the score is greater than T, then the patterns come from the same original configuration. If the score is less than T, then the patterns are not from the same origin. For example, by sampling a great number of finger prints (including both the same finger print and different finger prints) and doing a statistical analysis, a threshold (T) can be obtained. The threshold can be used to tell if a finger print is the same as a particular finger print. If the score obtained with an arbitrary finger print and a reference finger print is greater than the threshold, then it is clear that the arbitrary finger print is the same as the reference.

For those skilled in the art, it is quite possible to give the four factors $X_1$, $X_2$, $X_3$ and $X_4$ weighting factor respectively different to adjust the value of the score to suit the necessity of different purposes.

Since it is very often that a pattern is translated, rotated, and/or magnified before it is sampled increasing $X_3$ value obtained from equation (6), the score so calculated may not be suitable.

In order to eliminate this kind of situation and to match two patterns more correctly, the registration of a pattern should be done first before it is compared with a given reference.

In the following, the registration of a pattern done with the least mean square error is described.

LEAST MEAN SQUARE ERROR REGISTRATION

When a mating pair is selected, its point of set Q is rotated, translated and/or magnified so as to make the average distance between mated points of set P and those of set Q a minimum. The similarity between P and Q can then be computed with the registered pattern. The minimum distance therebetween is calculated with the least mean square error method as described in the following:

Consider a transformation R which transforms $q_{mi}(x_{mi}, y_{mi})(i=1, 2, \ldots, k)$, points of Q to $q'_{mi}(x'_{mi}, y'_{mi})$ so as to minimize the sum $$\sum_{i=1}^{k} [(x_i - x'_{mi})^2 + (y_i - y'_{mi})^2]$$

The transformation of $q_{mi}$ is $$\begin{pmatrix} x'_{mi} \\ y'_{mi} \end{pmatrix} = R \begin{pmatrix} x_{mi} \\ y_{mi} \end{pmatrix} = \begin{pmatrix} r_1 \\ r_2 \end{pmatrix} + \begin{pmatrix} r_3 & -r_4 \\ r_4 & r_3 \end{pmatrix} \begin{pmatrix} x_{mi} \\ y_{mi} \end{pmatrix}$$

where $r_1$ and $r_2$ represent amounts of translation and $r_3$ and $r_4$ represent amounts of rotation. With the transformation described above, a pattern is most suitably registered to reduce or minimize $X_3$.

EXAMPLES

Figure 4:
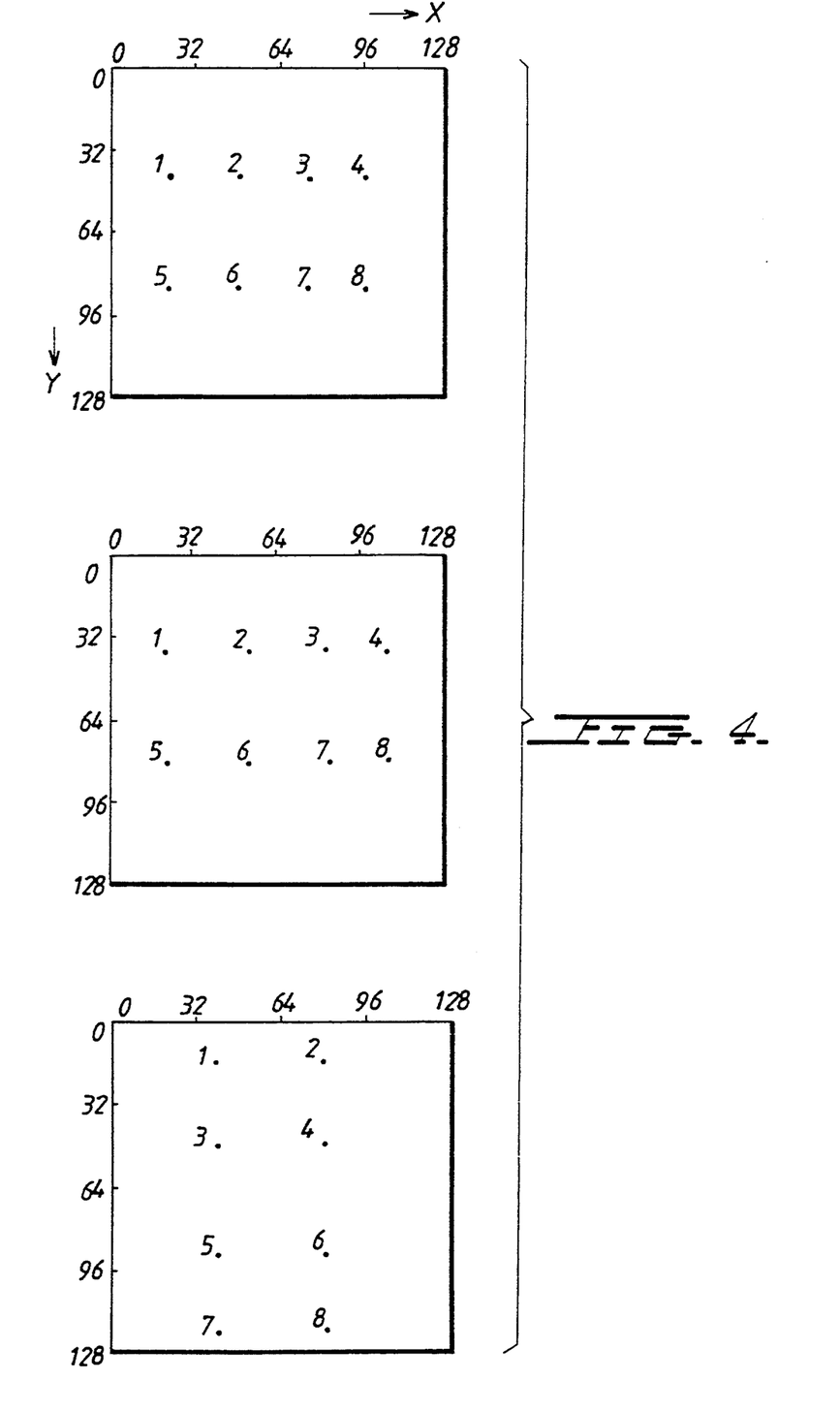
FIG. 4 shows the diagrams of three planar point patterns taken as examples to describe the present invention.

In FIG. 4, three planar point patterns, A, B, and C are shown. Each is constituted by eight points, of which the coordinates are also listed in FIG. 4. By inspection, it is seen that pattern B is obtained from pattern A with suitable translation and scaling. Pattern C is obviously not similar to pattern A.

(A) Matching Pattern A to Pattern B

Figure 5:
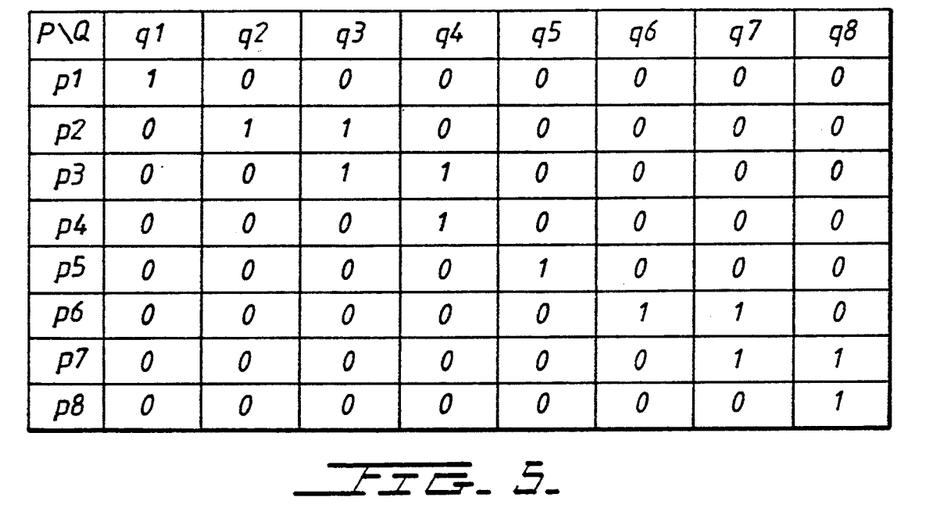
FIG. 5 shows the initial mating probability in matching patterns A and B of FIG. 4, in accordance with the coarse matching method.

To start the matching, the mating probability calculating device is used first to pick out the possibly-mated pairs with the aid of the coarse matching method. In this example, it is to exclude the pairs having points with the X- or Y-coordinates being different from each other for a value greater than 30 (i.e. n=30). The result is shown in FIG. 5. The initial mating probabilities of these possible-mated pairs are all set to unity, while those of the pairs excluded by the coarse matching method are set to zero.

Figure 6:
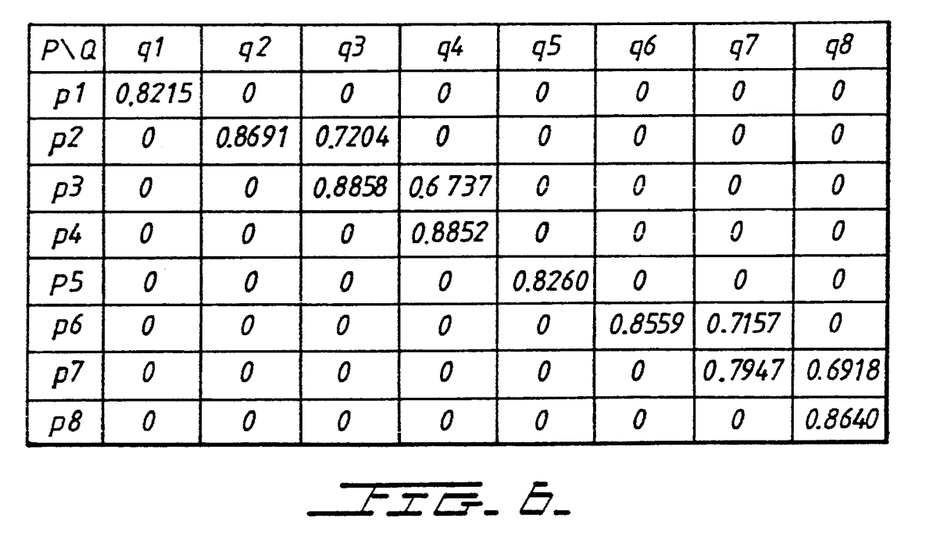
FIG. 6 shows the revised mating probabilities obtained from the data of FIG. 5 by the fuzzy relaxation method.

Next, apply equation (1) to revise the mating probabilities. The result of being revised twice is shown in FIG. 6.

The mating point selecting device, which applies the sequential forward selection method, picks out the largest 8 mating probabilities which are listed, in order, as follows:

K=8

S={0.8858, 0.8852, 0.8691, 0.8640, 0.8559, 0.8260, 0.8251, 0.7947 }

Figure 7:
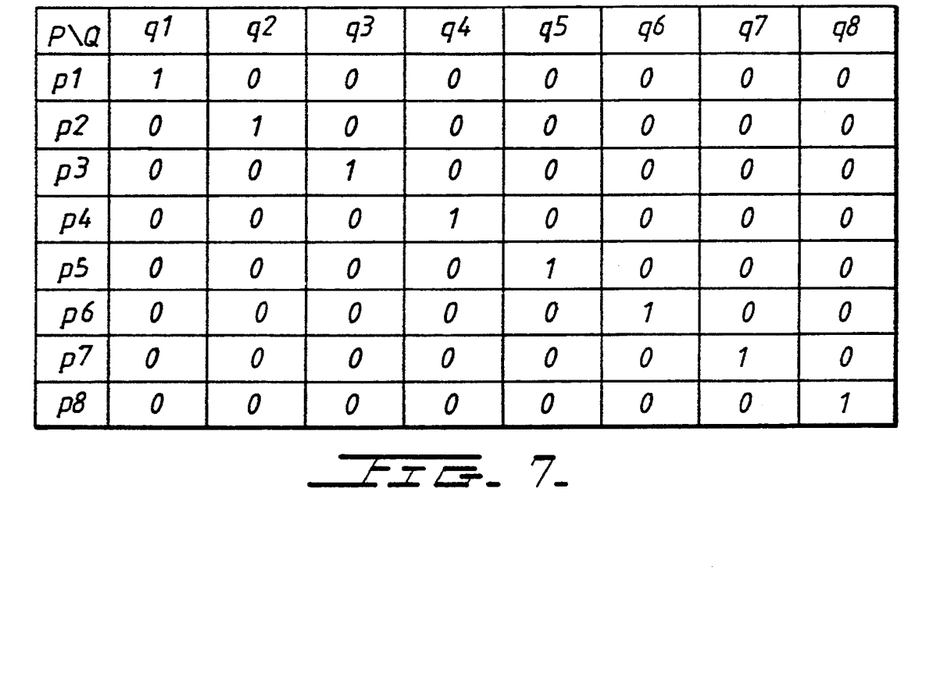
FIG. 7 shows the result of the data shown in FIG. 6 being processed by the sequential forward selection method.

The 8 point pairs associated with the 8 mating probabilities listed above can be obtained and are shown in FIG. 7, wherein 1 denotes a mated pair and 0 non-mated pair.

The factors $X_1$, $X_2$, $X_3$ and $X_4$ are calculated by the similarity calculating device and they are

| | |
|---|---|
| $X_1 = 1$ | from equation (4), |
| $X_2 = 0.8502$ | from equation (5), |
| $X_3 = 6.4780$ | from equation (6), and |
| $X_4 = 1$ | from equation (7), |

The score obtained with equation (8) is 13124.42, if the constant C is taken as 100,000 in this example. If the threshold used here is less than this number 13124.42, i.e. T<Score=13124.42, then the patterns are considered similar, otherwise not similar.

(B) Matching Pattern A to Pattern C

Figure 8:
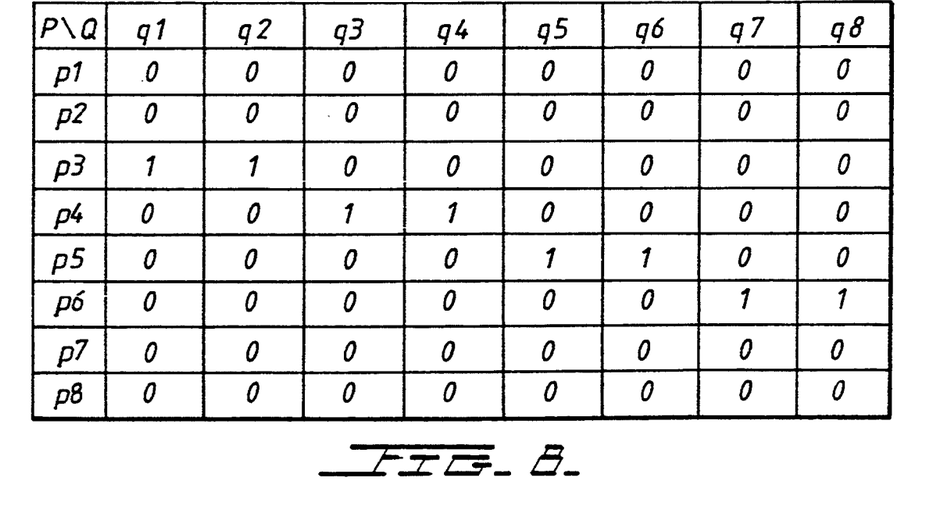
FIG. 8 shows the initial mating probabilities in matching patterns A and C of FIG. 4, in accordance with the coarse matching method.
Figure 9:
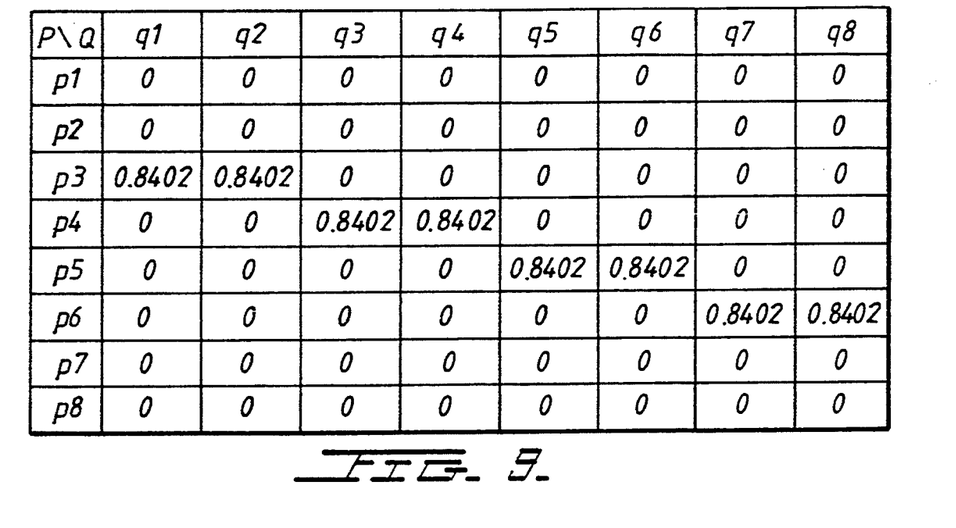
FIG. 9 shows the revised mating probabilities obtained from the data of FIG. 8 by the fuzzy relaxation method.

With the same procedure used in the previous example, the initial mating probabilities and the revised mating probabilities are obtained and respectively shown in FIGS. 8 and 9. Therefore, we have K=8 and

S={0.8402, 0.8402, 0.8402, 0.8402, 0.8402, 0.8402, 0.8402, 0.8402}

Figure 10:
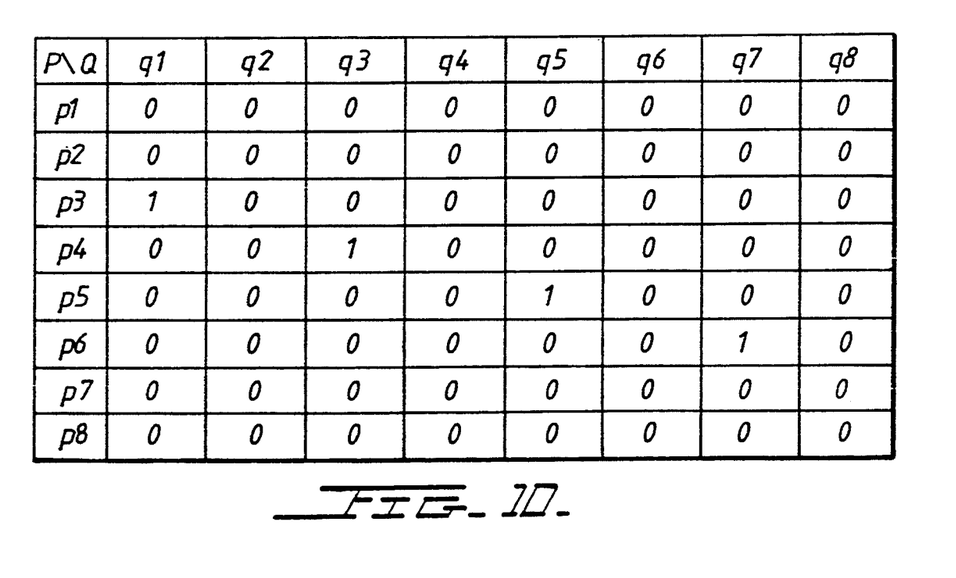
FIG. 10 shows the result of the data shown in FIG. 9 being processed by the sequential forward selection method.

From the above, a matching relationship between the two patterns is obtained and shown in FIG. 10. It is seen that $p_3$ mates $q_2$, $p_4$ mates $q_4$, $p_5$ mates $q_6$, and $p_6$ mates $q_8$. From the similarity calculation, we have $X_1=0.25$, $X_2=0.8402$, $X_3=15.7910$ and $X_4=1$ and it follows that Score=1330.18, if C is 100,000. Since the score is much smaller than the threshold, it is concluded that patterns A and C are not similar.

It is understood that the device and method of the present invention are capable of more precisely matching two patterns, even though the patterns to be matched are distorted. This is not possible to do with conventional devices. Further, under the situation that the numbers of points in the patterns are different, the present invention is still effective in matching similar patterns.

A method and device for automatically matching planar point patterns is described above. Various details of the invention may be changed without departing from its scope. Furthermore, the foregoing description of the preferred embodiment according to the present invention is provided for the purpose of illustration only and not for the purpose of limitation of the invention being defined by the appended claims.

What is claimed is:

1. In an automatic planar point pattern matching device, used with a computer system having memories to decide whether a first planar point pattern is similar to a second planar point pattern, the improvement comprising:

a first memory to save planar positional data of points of a first point pattern;

a second memory to save planar positional data of points of a second point pattern;

a third memory to save probability values of each point of said first point pattern to mate with each point of said second point pattern;

a mating probability calculating device which presets all the probability values of each point of said first point pattern to mate with each point of said second point pattern to set values, uses the relaxation method to revise initial probability values and saves the final mating probability values into said third memory;

a fourth memory to save data of best mating point pairs;

a mating point selecting device which uses the sequential forward selection method to select from said first point pattern and said second point pattern the pairs of points with the highest mating probability values, as saved in said third memory, and save the results into said fourth memory;

a similarity value calculating device which utilizes the result obtained with said mating point selecting device and/or said coordinates of the selected points to decide the similarity value between said first point pattern and said second point pattern; and a registration and comparison device, to register an adjustable threshold value and to compare said threshold value with said similarity value and output the result therefrom;

wherein said matching device decides said first and second patterns are similar when said similarity value is greater than said threshold value.

2. A device as claimed in claim 1, wherein said mating probability calculating device revises said pre-set initial mating probability value between a point ($p_j$) of said first point pattern and a point of said second point pattern according to the probability for $p_h$, another point of said first pattern, to form a correctly-mated pair with $q_k$, another point of said second point pattern, when said points $p_i$ and $q_j$ form a correctly-mated pair.

3. A device as claimed in claim 2 wherein said mating probability calculating device repeatedly revises the probability for said point $p_i$ of said first pattern to mate with said point $q_j$ of said second pattern in accordance with the equation:

$$S^{(r)}(p_i, q_j) = \frac{\sum_{h=i, k=j} \{\max[S^{(r-1)}(p_i, q_j) * C_{ij}(h, k)]\}}{m - 1}$$

wherein $S^{(r)}(p_i, q_j)$ represents the mating probability value of point $p_i$ and point $q_j$ at the $r^{th}$ revision, m is the total number of points conatined in said first pattern, $C_{ij}(h, k)$ is the probability of another point $p_h$ of said first pattern to mate another point $q_k$ of said second pattern, when $p_i$ and $q_j$ form a correctly-mated pair, and $S^{(0)}(p_i, q_j)$ denotes the initial mating probability of $p_i$ and $q_j$.

4. A device as claimed in claim 3 wherein $C_{ij}(h, k)$ is calculated by the equations:

$$C_{ij}(h, k) = 1/1 + \Delta$$

and $$\Delta = |l_{ih} - l_{jk}| / |l_{ih} + l_{jk}|$$

where l represents the distance in a planar coordinate system between the points that are shown as subscripts in the above equations.

5. A device as claimed in claim 1, wherein said mating probability calculating device comprises an initial making probability reset device which resets said initial mating probability value to zero when the distance between two points is greater than a given value.

6. A device as claimed in claim 5, wherein said distance between two points is the distance along the X-axis of said coordinate system.

7. A device as claimed in claim 5, wherein said distance between two points is the distance along the Y-axis of said coordinate system.

8. A device as claimed in claim 1, wherein said mating point selecting device comprises a mating probability sequencing means and a mating point searching means, said mating probability sequencing means putting the mating probability values, calculated by said mating probability calculating device, and the pairs of points represented by said values, in a largest-to-smallest sequence and selecting the same number of pairs of points bearing the largest probability values as the number of points of said first or second pattern, whichever is smaller, and said mating point searching means searching the pairs of points selected by said mating probability sequencing means as correctly-mated pairs and neglecting the rest of the pairs of points.

9. A device as claimed in claim 1, wherein said similarity calculating device computes a similarity between said first and second patterns by making use of the following factors (a) Matching Probability ($x_1$):

$$x_1 = \frac{(\text{number of correctly-mated pairs})^2}{(\text{number of points in } P) * (\text{number of points in } Q)}$$

wherein P represents said first pattern and Q represents said second patterns;

(b) Average Mating Probability ($x_2$):

$$x_2 = \sum_{i=1}^{k} S^{(r)}(p_i, q_{mi})/k$$

where k is the number of mated pairs, $S^{(r)}(p_i, q_{mi})$ is the probability of $p_i$ mating its mated point $q_{mi}$;

(c) Average Distance Between Points of Mated Pairs ($x_3$):

$$x_3 = \sum_{i=1}^{k} [(x_i - x'_{mi})^2 + (y_i - y'_{mi})^2]/k$$

where k is the number of mated pairs and ($x_i$, $y_i$) and ($x'_{mi}$, $y'_{mi}$) represent coordinates of pi and qmi, respectively; and (d) Scaling Factor ($x_4$):

$$x_4 = 1 + |1 - s|$$

where S is the scaling score.

10. A device as claimed in claim 9, wherein said similarity calculating device calculates similarity between said first and second patterns with the equation;

$$\text{Score} = C \frac{(X_1 * X_2)}{(X_3 * X_4)}$$

where C is a constant and score represents the similarity between said first and second patterns.

* * * * *